US011354229B1

(12) United States Patent
Dysert et al.

(10) Patent No.: US 11,354,229 B1
(45) Date of Patent: Jun. 7, 2022

(54) METHOD AND APPARATUS FOR AUTOMATED INFORMATION LIFECYCLE MANAGEMENT USING A FEDERATION OF ARRAYS

(71) Applicant: EMC IP Holding Company LLC, Hopkinton, MA (US)

(72) Inventors: David C. Dysert, Holliston, MA (US); Salvatore DeSimone, Woodbury, CT (US); Puneet B. Lal, Shrewsbury, MA (US); Ananthan Kathiravelupillai, Shrewsbury, MA (US); Edgar J. St. Pierre, Venice, FL (US)

(73) Assignee: EMC IP Holding Company LLC, Hopkinton, MA (US)

( * ) Notice: Subject to any disclaimer, the term of this patent is extended or adjusted under 35 U.S.C. 154(b) by 475 days.

(21) Appl. No.: 13/631,039

(22) Filed: Sep. 28, 2012

(51) Int. Cl.
*G06F 12/02* (2006.01)
(52) U.S. Cl.
CPC .......... *G06F 12/02* (2013.01); *G06F 12/0207* (2013.01); *G06F 12/0215* (2013.01)
(58) Field of Classification Search
CPC ..................................................... G06F 12/02
USPC .................................................... 711/1–200
See application file for complete search history.

(56) References Cited

U.S. PATENT DOCUMENTS

| | | | |
|---|---|---|---|
| 8,832,039 B1 * | 9/2014 | Sorenson, III | G06F 7/00 707/679 |
| 2007/0185934 A1 * | 8/2007 | Cannon | G06F 11/1451 |
| 2007/0214268 A1 * | 9/2007 | Laurent | G06F 3/0607 709/226 |
| 2013/0054927 A1 * | 2/2013 | Raj | G06F 3/0608 711/170 |
| 2013/0111471 A1 * | 5/2013 | Chandrasekaran | G06F 9/455 718/1 |
| 2013/0159637 A1 * | 6/2013 | Forgette | G06F 3/0605 711/154 |
| 2013/0275669 A1 * | 10/2013 | Naga | G06F 12/0866 711/113 |

* cited by examiner

*Primary Examiner* — David Yi
*Assistant Examiner* — Zubair Ahmed
(74) *Attorney, Agent, or Firm* — Ryan, Mason & Lewis, LLP

(57) ABSTRACT

Example embodiments of the present invention provide a method, an apparatus, and a computer program product for providing information lifecycle management using a federation of arrays. The method includes receiving a request to provision storage resources of a one big array according to a class of service, the one big array comprising heterogeneous storage resources, and causing the requested storage resources to be provisioned according to a provisioning policy. Execution of an information lifecycle management policy then may be initiated for management of data stored to the storage resources according to the class of service.

21 Claims, 5 Drawing Sheets

| LINE OF SERVICE | SERVICE LEVEL ATTRIBUTES/KPIS | CLASSES OF SERVICE | | |
|---|---|---|---|---|
| | | GOLD | SILVER | BRONZE |
| PRIMARY STORAGE | MAX UNPLANNED DOWNTIME / YEAR | 5.25 MIN | 52.5 MIN | 525 MIN |
| | EXPECTED SATURATION LATENCY THRESHOLD | 2 MS | 12 MS | 30 MS |
| | NO SINGLE POINT OF FAILURE | YES | YES | YES |
| | LOCATION | BOSTON/RTP | BOSTON | UNSPECIFIED |
| | SPACE EFFICIENT | NO | NO | YES |
| | ALLOCATE ON DEMAND | YES | YES | YES |
| STORAGE SECURITY | ENCRYPTION | YES | NO | NO |
| ARCHIVE STORAGE | MAX UNPLANNED DOWNTIME | 263 MIN | 42 HOURS | 48 HOURS |
| | MAX INITIAL RESPONSE TIME | 20 MS | 5 MINS | 24 HOURS |
| | DATA RETENTION TIME | FOREVER | 2 YEARS | UNLIMITED |
| | AUTHENTICITY GUARANTEE | NO | YES | NO |
| | LOCATION | LOCAL | OFFSITE | OFFSITE |
| | DATA DESTRUCTION METHOD | SECURE ERASE | QUICK ERASE | PHYSICAL DESTRUCTION |
| OPERATIONAL RECOVERY | RECOVERY POINT OBJECTIVE (RPO) | 1 HOUR | 12 HOURS | 24 HOURS |
| | RECOVERY TIME OBJECTIVE (RTO) | 1 HOUR | 4 HOURS | 48 HOURS |
| | SERVICE IMPACT DURING PROTECTION | TBD | TBD | TBD |
| | MIN NUMBER OF RECOVERY VERSIONS | 8 | 4 | 4 |
| DISASTER RECOVERY | RECOVERY POINT OBJECTIVE (RPO) | 15 MIN | 24 HOURS | 24 HOURS |
| | RECOVERY TIME OBJECTIVE (RTO) | 1 HOUR | 8 HOURS | 1 WEEK |
| | MIN NUMBER OF RECOVERY VERSIONS | 4 | 7 | 7 |
| | LOCATION | BOSTON | SANTA CLARA | BOSTON |

FIG. 4

METHOD AND APPARATUS FOR AUTOMATED INFORMATION LIFECYCLE MANAGEMENT USING A FEDERATION OF ARRAYS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This Application is related to U.S. patent application Ser. No. 13/630,455 entitled "SINGLE CONTROL PATH", Ser. No. 13/631,030 entitled "METHOD AND APPARATUS FOR FEDERATING A PLURALITY OF ONE BIG ARRAYS", Ser. No. 13/631,055 entitled "METHOD AND APPARATUS FOR FEDERATED IDENTITY AND AUTHENTICATION SERVICES", Ser. No. 13/631,190 entitled "METHOD, APPARATUS, AND SYSTEM FOR MANAGING DATA STORAGE WITH AN APPLICATION PROGRAMMING INTERFACE", Ser. No. 13/631,214 entitled "AUTOMATED POLICY BASED SCHEDULING AND PLACEMENT OF STORAGE RESOURCES", and Ser. No. 13/631,246 entitled "DISTRIBUTED SYSTEM SOFTWARE INFRASTRUCTURE" filed on even date herewith, the teachings of which applications are hereby incorporated herein by reference in their entirety.

TECHNICAL FIELD

This application relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligence and communications electronics and software for making the data on the disks available. To leverage the value of MSS, these are typically networked in some fashion.

Popular implementations of networks for MSS include network attached storage (NAS) and storage area networks (SAN). In NAS, MSS is typically accessed over known TCP/IP lines such as Ethernet using industry standard file sharing protocols like NFS, HTTP, and Windows Networking. In SAN, the MSS is typically directly accessed over Fibre Channel switching fabric using encapsulated SCSI protocols.

Each network type has its advantages and disadvantages, but SANs are particularly noted for providing the advantage of being reliable, maintainable, and being a scalable infrastructure, but their complexity and disparate nature make them difficult to centrally manage. Thus, a problem encountered in the implementation of SANs is that the dispersion of resources tends to create an unwieldy and complicated data storage environment. Reducing the complexity by allowing unified management of the environment instead of treating it as a disparate entity would be an advancement in the data storage computer-related arts. While it is an advantage to distribute intelligence over various networks, it should be balanced against the need for unified and centralized management that can grow or scale proportionally with the growth of what is being managed. This is becoming increasingly important as the amount of information being handled and stored grows geometrically over short time periods and such environments add new applications, servers, and networks also at a rapid pace.

SUMMARY

Example embodiments of the present invention provide a method, an apparatus, and a computer program product for providing information lifecycle management using a federation of arrays. The method includes receiving a request to provision a one big array according to a class of service, the one big array comprising heterogeneous storage resources, and causing the requested storage resources to be provisioned according to a provisioning policy. An information lifecycle management policy then may be set for management of data stored to the storage resources according to the class of service.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 4 is a table illustrating example lines of services and key performance indicators (KPIs) for respective classes of service;

DETAILED DESCRIPTION

Traditional information lifecycle management (ILM) schemes move data between tiers (i.e., storage types) of a particular data storage system or between different types of storage devices (i.e., disk to tape). However, example embodiments of the present invention provide automated ILM across not only tiers of storage systems but also across storage platforms and storage types, abstracting away the predefined connections between sources and destinations and help support more flexibility in using different types of data transitions. In certain embodiments, the ILM may be provided as part of a class of service provided by a heterogeneous storage system. Further, in other embodiments, the data is classified as part of a class of service at the time of provisioning. Instead of doing classification up front and then trying to find the technologies to do the work according to those policies, example embodiments of the present invention provision data into the right catalog offering/class of service. For example, a policy may require "store this data requires snapshots every hour; after a certain number of snapshots, move snapshots to low cost storage on another device."

Figure 1:
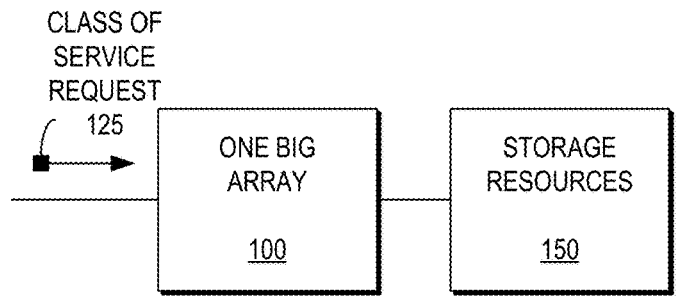
FIG. 1 is a block diagram illustrating a request to provision a one big array according to a class of service, the one big array comprising heterogeneous storage resources.

FIG. 1 is a block diagram illustrating a request to provision a one big array according to a class of service, the one big array comprising heterogeneous storage resources. One big arrays may be comprised of heterogeneous storage resources and may enable multiple types of data services through a single control path. A data service may be a service for how data is stored, received and processed. In certain embodiments, data services provide the high-level data and storage management capabilities of the system. A control path may be a way to establish and control access to the data. One big arrays are described in greater detail in U.S. patent application Ser. No. 13/630,455 entitled "SINGLE CONTROL PATH", filed on even date herewith, the contents and teachings of which are incorporated herein by reference in their entirety.

Figure 3:
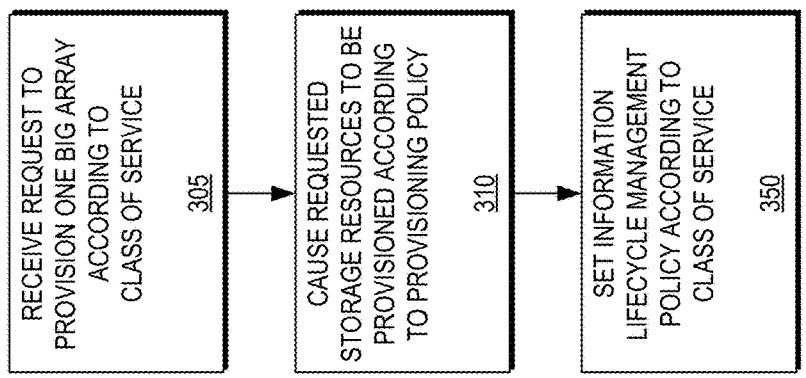
FIG. 3 is a flow diagram illustrating a method for provisioning a one big array according to a class of service according to an example embodiment of the present invention.

FIG. 3 is a flow diagram illustrating a method for provisioning a one big array according to a class of service according to an example embodiment of the present invention. FIGS. 1 and 3 may be studied in conjunction.

As illustrated in FIG. 1, a one big array 100 may receiving a request 125 to provision a one big array 100 according to a class of service, the one big array 100 comprising heterogeneous storage resources 150 (305). The one big array 100 then may cause the requested storage resources 150 to be provisioned according to a provisioning policy (310). An information lifecycle management policy then may be set for management of data stored to the storage resources 105 according to the class of service (350).

Figure 2:
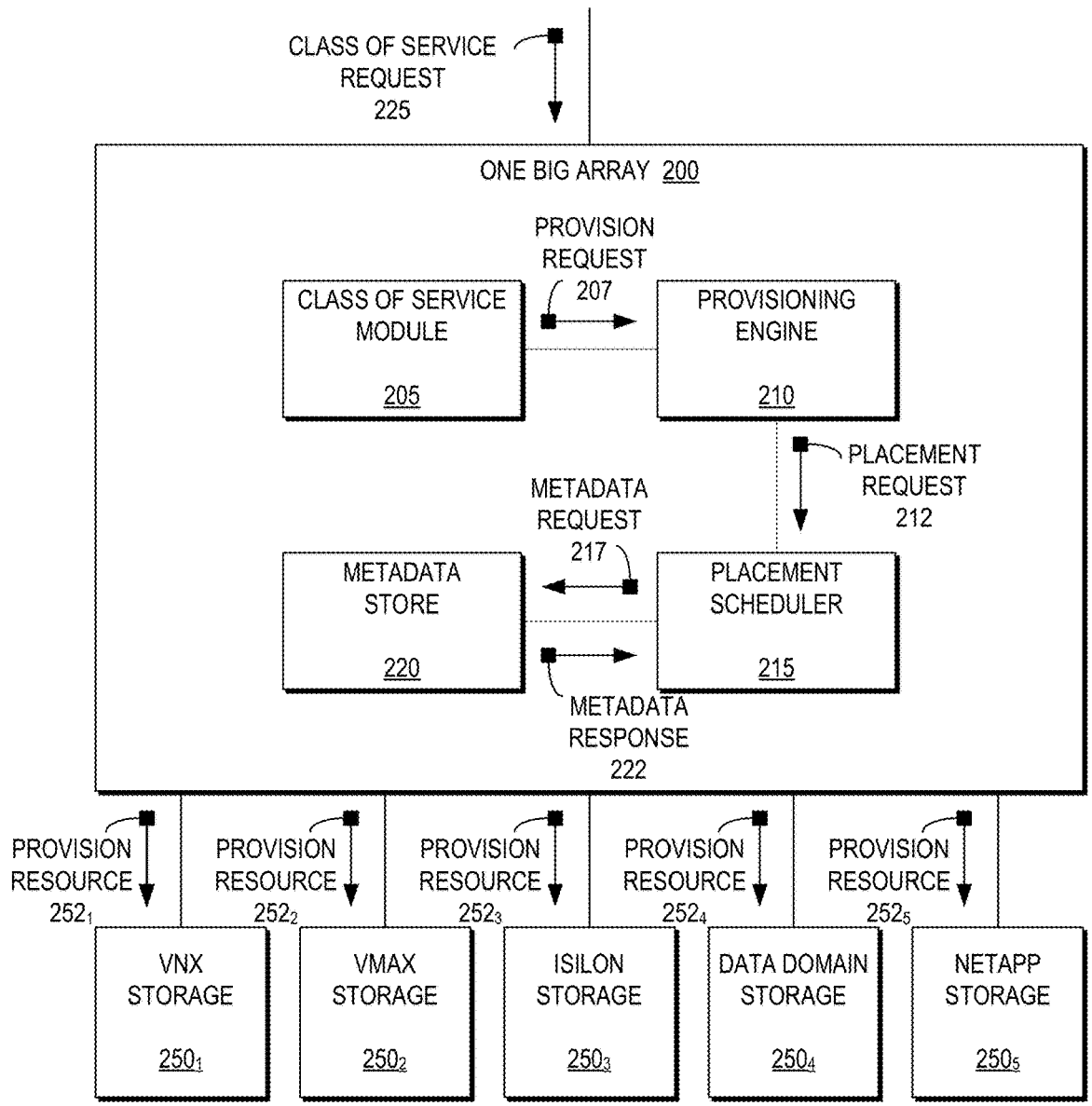
FIG. 2 is a block diagram illustrating a request to provision a one big array according to a class of service, the one big array comprising heterogeneous storage resources, with the one big array provisioning heterogeneous storage resources according to attributes of resource availability.

FIG. 2 is a block diagram illustrating a request 225 to provision a one big array 200 according to a class of service, the one big array 200 comprising heterogeneous storage resources $250_1$-$250_5$ (250 generally), with the one big array 200 provisioning heterogeneous storage resources 250 according to attributes of resource availability. As illustrated in FIG. 2, most data centers have a heterogeneous storage infrastructure, meaning that they comprise different types of storage, provided by different vendors and having different storage capabilities, services, and attributes. For example, a data center may use systems, such as VMAX® and VNX® from EMC Corporation of Hopkinton, Mass., for tiers of storage, Data Domain® from EMC Corporation for backup, and other storage solutions from NetApp Corporation of Sunnyvale, Calif., or Hitachi Data Systems Corporation of Santa Clara, Calif. As described in U.S. patent application Ser. No. 13/630,455 entitled "SINGLE CONTROL PATH", the one big array makes the storage infrastructure appear as one logical array, allowing storage administrators, for example, to define classes of service. In certain embodiments, a service provider system administrator may define classes of service. In other embodiments, this authority may be delegated to an administrator for a tenant hosted by the service provider.

A one big array 200 may receive a class of service request 225. In certain embodiments, the class of service request 225 may be received from a user or tenant of the one big array 200, as described in U.S. patent application Ser. No. 13/631,030, entitled "METHOD AND APPARATUS FOR FEDERATING A PLURALITY OF ONE BIG ARRAYS" filed on even date herewith, the teachings of which are hereby incorporated by reference in their entirety.

The one big array 200 may include a class of service module 205, a provisioning engine 210, a placement scheduler 215, and a metadata store 220. The class of service module 205 may forward a provision request 207 to the provisioning engine 210 (515). The provision request 207 may include attributes of the requested lines of service. It should be understood that, in a preferred embodiment, the information lifecycle management system may be application agnostic, meaning the system may provide a class of service regardless of what kinds of information an application requesting the class of service is storing.

In certain embodiments, the class of service comprises a plurality of lines of service and describes storage resources available from the one big array. In a preferred embodiment, a class of service describes the storage service capabilities associated data services (e.g., file, block, and object stores). Storage services are described in greater detail in U.S. patent application Ser. No. 13/631,214, entitled "AUTOMATED POLICY BASED SCHEDULING AND PLACEMENT OF STORAGE RESOURCES" filed on even date herewith, now U.S. Pat. No. 9,417,997, the teachings of which are hereby incorporated by reference in their entirety. Lines of service also may include services that may be provided not just by storage products comprising the one big array but also by other products comprising the one big array, such as AppSync™ and EMC RecoverPoint™ from EMC Corporation of Hopkinton, Mass. Therefore, many different configurations of products can be used to deliver the same "service," as described abstractly by the class of service. This is particularly important, in example embodiments of the present invention, because some services may be provided by the one big array, by these other products, or some combination thereof, depending on how the infrastructure is configured.

Classes of service may represent high-level capabilities and services that are created by users through composition of resource attributes and quality of services, including level of protection, availability, access protocol, performance, and additional storage/data services, such as versioning/snap, backup, remote replication, data reduction, encryption, etc. Classes of service may be managed by the data services provided by the one big array 200, which may create, modify, delete, and enumerate classes of service. In certain embodiments, a class of service may be deleted only when there are no resources provisioned within the class of service. Classes of service may be immutable (i.e., once created, a class of service cannot be changed).

Each class of service may have a name (e.g., gold, silver, bronze) and a set of capabilities that describe the services it offers. In certain embodiments, there may be a separate class of service defined for each data service (e.g., file, block, and object stores) (i.e., the data services may define a separate class of service namespace). Each of these data services may offer multiple service levels, with each service level described by a class of service that describes the capabilities offered.

In other embodiments, the scope of a class of service may be limited to a single zone. Zones are described in greater detail in U.S. patent application Ser. No. 13/631,030 entitled "METHOD AND APPARATUS FOR FEDERATING A PLURALITY OF ONE BIG ARRAYS" filed on even date herewith, the teachings of which are hereby incorporated by reference in their entirety.

Therefore, a class of service may be created in certain embodiments by invoking an application programming interface (API) of the desired data service in the desired zone. APIs for the system are described in greater detail in U.S. patent application Ser. No. 13/631,190, entitled "METHOD, APPARATUS, AND SYSTEM FOR MANAGING DATA STORAGE WITH AN APPLICATION PROGRAMMING INTERFACE" filed on even date herewith, now U.S. Pat. No. 10,157,124, the teachings of which are hereby incorporated by reference in their entirety. A class of service creation API exposed by each data service may optionally provide a way for the caller to create the same class of service across multiple zones with a single call. These class of service creation requests may be forwarded by a zone to its peer zones. As a result of such an aggregate call, each zone may have a distinct object representing the requested class of service which may be managed independently.

Within a class of service there are attributes regarding the primary storage (e.g., speed for block storage, RAID protection) operational recovery (i.e., near term backup) (e.g., snapshots, the number of snapshots, backup of snapshots) and archival (i.e., long term protection). Therefore, in certain embodiments, and as described in greater detail below with respect to FIG. 4, the one big array may receive an indication regarding attributes of each respective lines of service of a set of requested lines of service of the plurality of lines of service.

It should be noted that a class of service does not define just drive speeds. For example, copies of the data may be needed for operational recovery. Combinations of lines of service may be included in a policy statement, which may be included in the class of service. For example, an administrator may define a Gold class of service to map to a particular quality of service of storage requiring a certain level of I/Os per second (IOPS) provided by VNX $250_1$ or VMAX $250_2$ protection attributes requiring a recovery point objective (RPO) for operational recovery of 1 hour, archival for 7 years, and an information lifecycle management policy of moving the data from the VMAX $250_2$ tier of storage to the VNX $250_1$ tier of storage after 90 days and moving the data from the VNX $250_1$ to Data Domain $250_4$ after 180 days. The class of service also may include attributes with respect to replication.

Further, suppose an application requires a Gold class of service logical unit (LUN). Example embodiments of the present invention decide from which storage resource 250 to provision the LUN according to the class of service (i.e., VMAX $250_2$ or VNX $250_1$). Accordingly, the class of service module 205 may send a provision request 207 to the provisioning engine 210 to determine which storage resources 250 should be provisioned according to the requested class of service 225 to provision the requested storage in the request 225.

FIG. 4 is a table illustrating attributes for example lines of services and key performance indicators (KPIs) for respective classes of service. A line of service is characterized by a set of storage service capabilities. Attributes may include not only storage characteristics (e.g., primary storage (i.e., services for accessing the primary online version of the file share or block volume) and archive storage (i.e., services for moving data from a specific point in time to long-term storage facilities that have characteristics such as long latency or non-repudiation)) but also data protection (e.g., operational recovery (i.e., services for restoration of data to a point in time prior to a logical corruption of data) and disaster recovery (i.e., services for restoration of data from hardware failures at local or remote locations)) and security (i.e., services for securing data in flight and at rest).

As part of the definition of a capability, a constraint may be placed on the allowable values. If the constraint specifies a range of values then the caller may specify a parameter value for that capability when creating an instance of that resource type. In a preferred embodiment, the parameter value must fall within the constraint range as defined in the class of service. A capability with a range may have a default value assigned in which case it will be used if the caller did not specify a value for that parameter. In a preferred embodiment, a parameter value for a capability must be specified by the caller if the class of service definition includes a range but no default value.

A class of service describes the capabilities offered in one or more of the lines of service, examples of which are described in Table 1 below.

TABLE 1

Class of service lines of service and capabilities

| Line of Service | Description | Capability | Description |
|---|---|---|---|
| Primary Storage | Services for accessing the primary online version of the data. | access-protocol | Data service-specific protocol used to access the data: FC-SCSI, iSCSI, NFSv3, CIFS, etc. |
| | | size | Constraints (if any) on the size of the file share or block volume. |
| | | performance | Possible values are: Capacity, Performance, ExtremePerformance, GeneralPurpose, Undefined |
| | | resiliency | Relative measure of resilience to local component failure (measure of RAID resiliency) as compared to other CoS of the same data service: 1+32least available, 10+32most available |
| | | num_paths (block only) | Determines the number of paths to allocate for the storage resource. Used to provide highly-available volumes for hosts with multiple HBAs. |
| | | space_efficient | Storage will employ data storage efficiency techniques. Possible values of: Dedup, Compression, or None |
| | | allocate_on_demand | Possible values are: Thin, ThickEagerZeroed, ThickLazyZeroed, Undefined |
| | | neighborhood | The list of neighborhoods where the primary storage is available (empty set means available in all neighborhoods). |
| Operational Recovery | Services for restoration of data to a point in time prior to a logical corruption of data. | max_snapshots | The maximum number of snapshots (O+32no snapshots allowed). |
| | | multi_volume_consistency (block only) | Indicates if multi-volume snapshot consistency is available. |

An example class of service definition with its capabilities is shown below in Table 2.

TABLE 2

Sample class of service

| Line of Service | Capability | Defined Values |
|---|---|---|
| Primary Storage | access-protocol | FC or iSCSI, no default (must be specified by System Admin) |
| | size | 100 GB to 1 TB in increments of 50 GB, no default (must be specified by System Admin) |
| | performance | ExtremePerformance |
| | resiliency | 8 |
| | num_paths | 2-4, default: 2 |
| | space_efficient | None |
| | allocate_on_demand | Thin |
| Operational Recovery | max_snapshots | 0-10, default: 0 |
| | multi_volume_consistency | Yes |

Table 3 below illustrates capabilities, types of values, whether the values are used in pool search, and a description. The "Used in Pool Search?" column in the table below may indicate if the capability value is used by the placement scheduler 215 when searching the metadata store 220 for a candidate storage pool for resource creation. A value of "Yes" means the capability will be used in the search while a value of "No" indicates the capability will not be used in the search. Capabilities marked with "No" may mean the implementation of that capability is handled by a mechanism external to the underlying storage arrays, for example, by a layered management application.

TABLES 3

Capabilities, types of values, whether the values are used in pool search, and a description

| Line of Service | Capability | Type | Used in Pool Search? | Description |
|---|---|---|---|---|
| Primary Storage | access-protocol | Enumerated | Yes | Data service-specific protocol used to access the data: FC-SCSI, iSCSI, NFSv3, CIFS, ... |
| | size | Size Range | Yes | Constraints, if any, on the size of the file share or block volume |
| | performance | Enumerated | Yes | One of: Capacity, Performance, ExtremePerformance, GeneralPurpose, Undefined |
| | resiliency | Integer Range (1..10 or subset) | Yes | Relative measure of resilience to local component failure (e.g. measure of RAID resiliency) as compared to other CoS of the same data service: 1 = least available, 10 = most available |
| | max-paths (for block) | Integer Range (1..n or subset) | Yes | Determines the maximum number of paths to allocate for the storage resource. Used to provide highly-available volumes for hosts with multiple HBAs. |
| | space-efficient | Enumerated | Yes | Storage will employ data storage efficiency techniques. One of: Dedup, Compression, or None |
| | allocate-on-demand | Enumerated | Yes | One of: Thin, ThinOverwrite, ThickEagerZeroed, ThickLazyZeroed, Undefined |
| | neighborhood | Enumerated | Yes | The list of neighborhoods where the primary storage is available (empty set means available in all neighborhoods) |
| Security | Encryption | Enumerated | Yes | Services for securing data in flight and at rest |
| Archive Storage | data-retention-time | Time Duration Range | No | The period for which data will be retained |
| | data-destruction-method | Enumerated | No | An indication of how data is to be deleted by the archive service: SecureErase, QuickErase, PhysicalDestruction |
| | zone | Enumerated | No | The zone(s) where archives will be stored |
| Operational Recovery | recovery-point-objective | Time Duration Range | No | The maximum amount of time that data may be at risk of loss |
| | max-snapshots | Integer Range (0..n) | Yes | Max number of snapshots (0 = no snapshots allowed) |
| | multi-volume-consistency (for block) | Boolean Range | Yes | Indicates if multi-volume snapshot consistency is available |
| Disaster Recovery | recovery-point-objective | Time Duration Range | No | The maximum amount of time that data may be at risk of loss |
| | max-copies | Integer Range (0..n) | No | Max number of copies (0 = no copies allowed) |
| | multi-volume-consistency (block only) | Boolean Range | No | Indicates if multi-volume snapshot-consistency is available |
| | zone | Enumerated | No | The zone(s) where the disaster replicas will be stored |

Figure 5:
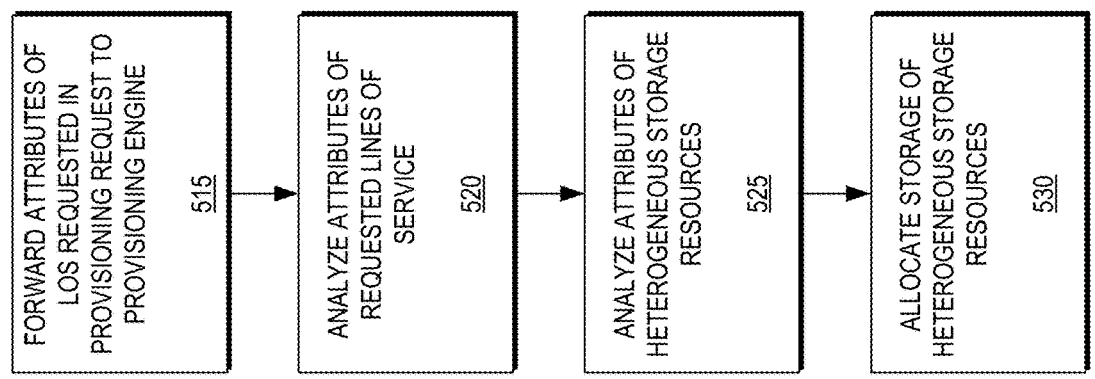
FIG. 5 is a flow diagram illustrating a method for causing allocation of storage of respective ones of the heterogeneous storage resources according to the storage requested for the requested lines of service, the availability of the heterogeneous storage resources, and attributes of the heterogeneous storage resources according to an example embodiment of the present invention.

FIG. 5 is a flow diagram illustrating a method for causing allocation of storage of respective ones of the heterogeneous storage resources according to the storage requested for the requested lines of service, the availability of the heterogeneous storage resources, and attributes of the heterogeneous storage resources according to an example embodiment of the present invention.

The provisioning engine 210 may be configured to analyze the attributes of the requested lines of service (520) and, in conjunction with a placement scheduler 215 configured to analyze attributes of the heterogeneous storage resources (525), allocate storage of respective ones of the heterogeneous storage resources according to the storage requested for the requested lines of service, the availability of the heterogeneous storage resources, and attributes of the heterogeneous storage resources (530). Accordingly, the provisioning engine 210 then may examine the provision request 207 to determine the requested class of service and, in response, send a placement request 212 to the placement scheduler 215 to determine available storage resources 250 to satisfy the provision request 207 (i.e., figure out which storage resource can provide the placement needs and meet information lifecycle management needs).

In order to determine the placement, the placement scheduler 215 may send a metadata request 217 to the metadata store 220 and receive a metadata response 222. The metadata store 220 may store metadata regarding capabilities, inter-connectivity, availability, and performance history of the storage resources 250. In certain embodiments, the placement scheduler 215 may satisfy storage requirements using drives with particular IO rates. However, a placement also may need underlying technology platforms with particular capabilities (e.g., move a copy after 30 days and then store it somewhere long term after 60 days). In certain embodiments, the placement scheduler 215 may use policies to determine where the requested Gold LUN is best suited to be provisioned (e.g., how loaded, available ports, physical connectivity, etc.).

The placement scheduler 215 then may send commands to provision resources $252_1$-$252_5$ (252 generally) to respective ones of the storage resources 250 according to the storage required as determined by the placement scheduler 215. In certain embodiments, the placement scheduler 215 may send requests 252 to storage resources 250 to provision placement storage and reserve storage on storage resources 250 for additional phases of the information lifecycle (e.g., operational recovery). The class of service module 205 then may set an information lifecycle management policy to be enforced by the one big array 200. In certain embodiments, extended provisioning may require an administrator to establish or reconfigure connections between storage resources to accommodate a requested class of service.

In certain embodiments, a data service may allocate the requested resource from the storage resources 250 as long as those resources are compatible with the requested class of service. In some embodiments, if no resources can satisfy the requested class of service, the provisioning request 207 will fail. In other embodiments, a resource from the "closest" class of service may be allocated in case resources for the exact requested class of service are unavailable or incompatible.

It should be noted that a class of service may describe not only services associated with a class of service, and possibly the lifecycle for the information being managed by the class of service, but also the ability for a user to divide an information lifecycle into different classes of service over the information lifecycle. In other words, the user may define a meta class comprised of classes of service assigned to different phases of the information lifecycle. For example, the user may like the Gold class of service, such as the performance and disaster recovery lines of service, but may not need the level of protection provided by it. Accordingly, the user may define a meta class of service that applies different classes of service within a time domain (i.e., over different portions of the information lifecycle) (e.g., Gold for 30 days, Silver for 30 days, if possible). Therefore, the user may request a class of service advertised by the one big array 200 or as defined by the user.

Figure 6:
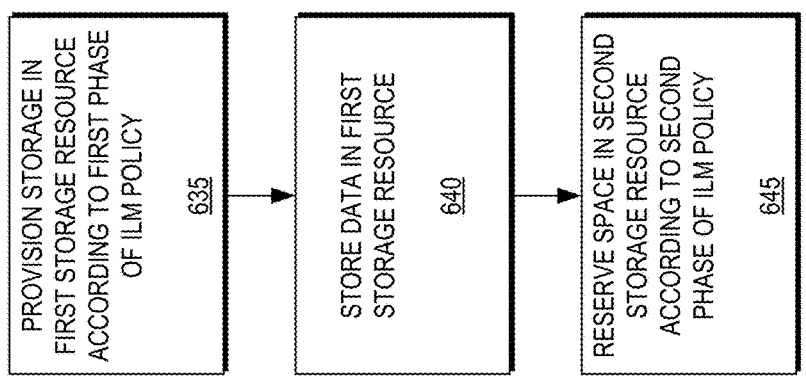
FIG. 6 is a flow diagram illustrating a method for causing allocation of storage of respective ones of the heterogeneous storage resources according to the storage requested for the requested lines of service, the availability of the heterogeneous storage resources, and attributes of the heterogeneous storage resources according to an example embodiment of the present invention.

FIG. 6 is a flow diagram illustrating a method for causing allocation of storage of respective ones of the heterogeneous storage resources 250 according to the storage requested for the requested lines of service, the availability of the heterogeneous storage resources 250, and attributes of the heterogeneous storage resources 250 according to an example embodiment of the present invention. As illustrated in FIG. 6, the provisioning engine 210 may cause provision of storage in a first storage resource 250 to store data according to a first phase of the information lifecycle management policy (635) and store data in the first storage resource 250 (640). The provisioning engine 210 then may reserve space in a second storage resource 250 according to a second phase of the information lifecycle management policy (645).

Figure 7:
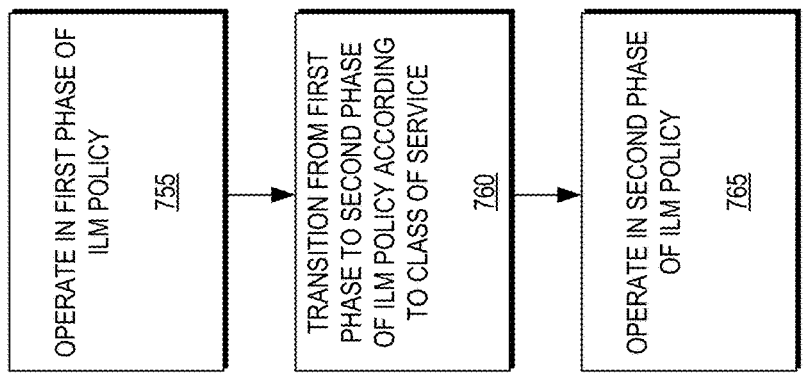
FIG. 7 is a flow diagram illustrating a method for setting an information lifecycle management policy for management of data stored to the storage resources according to the class of service according to an example embodiment of the present invention.

FIG. 7 is a flow diagram illustrating a method for setting an information lifecycle management policy for management of data stored to the storage resources 250 according to the class of service according to an example embodiment of the present invention. As illustrated in FIG. 7, the one big array 200 may operate in a first phase of the information lifecycle management policy (755). At a later time, according to the information lifecycle management policy, the one big array 200 may transition from the first phase of the information lifecycle management policy to a second phase of the information lifecycle management policy (760) by moving the data from a class of storage to a second class of storage according to the class of service. The one big array 200 then may operate in the second phase of the information lifecycle management policy (765). The one big array 200 may move the data between at least one of tiers of a first storage resource 250 and the first storage resource 250 and a second storage resource 250.

Figure 8:
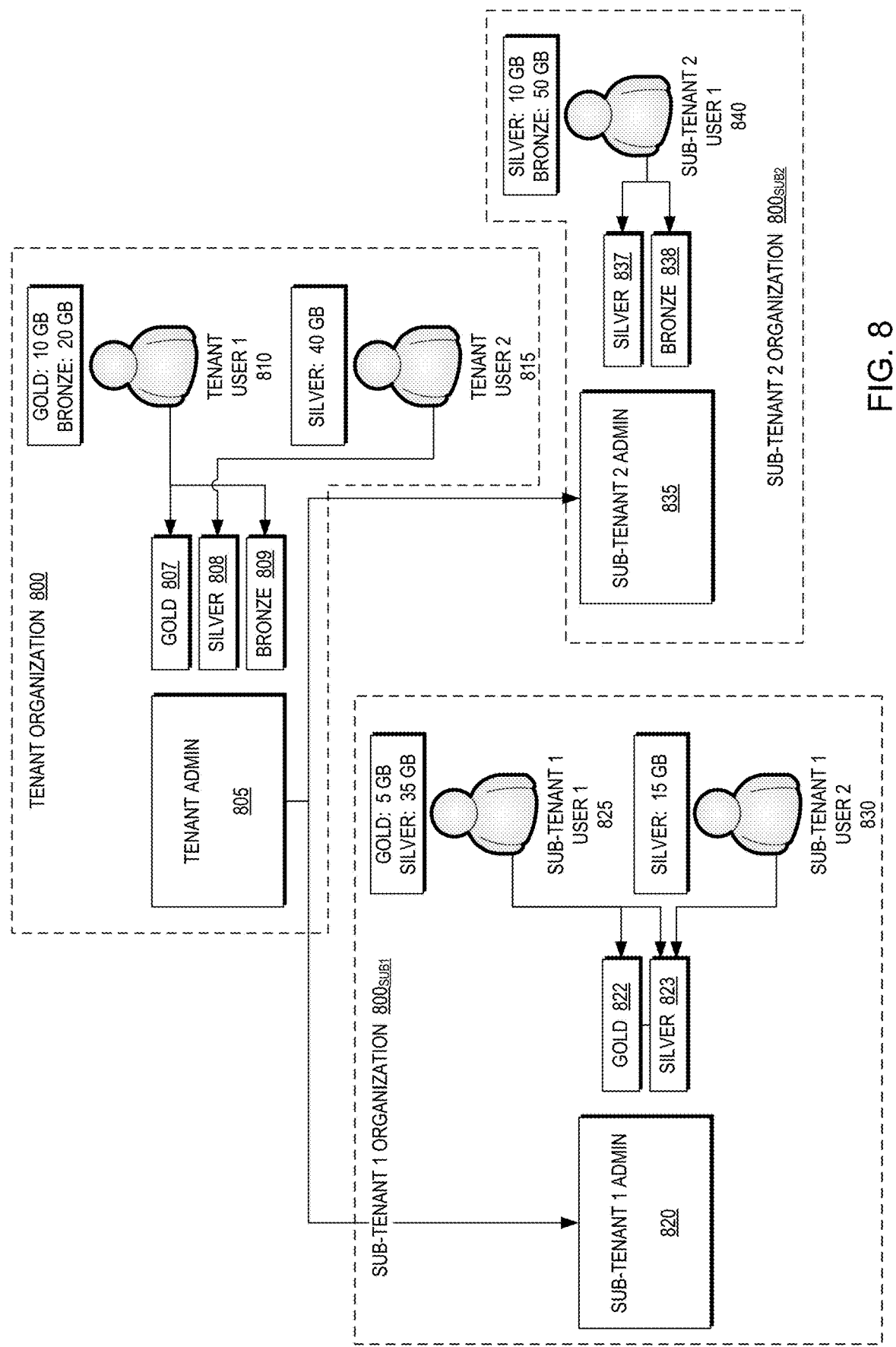
FIG. 8 is a block diagram illustrating creation of classes of service.

FIG. 8 is a block diagram illustrating creation of classes of service. In example embodiments of the present invention, a user having a role of SysAdmin may create and delete classes of service. Further, the system may have a single global set of classes of service for each data service, with access to classes of service by tenants being controlled by access control lists associated with each class of service. Roles and tenants are described in greater detail in U.S. patent application Ser. No. 13/631,055 entitled "METHOD AND APPARATUS FOR FEDERATED IDENTITY AND AUTHENTICATION SERVICES" filed on even date herewith, the teachings of which are hereby incorporated by reference in their entirety.

When a Tenant is created, the Tenant may be assigned a subset of the classes of service. In certain embodiments, each Tenant may further divide the assigned subset of classes of service into further subsets that the Tenant may provide to its Sub-Tenants. For example, a SysAdmin may create the following classes of service: Block:Gold, Block:Silver, File:Gold, Object:Gold, and Object:Bronze. The SysAdmin may assign all of the classes of service to a Root Tenant (not shown) which may then create three Sub-Tenants each being assigned a subset of the full list of classes of service: TenantA=(Block:Gold, File:Gold, Object:Gold), TenantB=(Block:Silver, Object:Bronze), and TenantC=(Object:Gold). In other embodiments, each Tenant may be allowed to create its own classes of service based on the resources/services/capabilities available to the Tenant.

The inheritance between Tenants and Sub-Tenants may be based on a matrix of resources that can be composed into classes of service by each tenant independently. The resource consumption may be metered and reported on a per resource type as opposed to on a per a class of service as each Tenant may have different classes of service for similar composition of resources and capabilities. Metering and reporting are described in greater detail in U.S. patent application Ser. No. 13/631,190 entitled "METHOD, APPARATUS, AND SYSTEM FOR MANAGING DATA STORAGE WITH AN APPLICATION PROGRAMMING INTERFACE" filed on even date herewith, now U.S. Pat. No. 10,157,124, the teachings of which are hereby incorporated by reference in their entirety. Although this model may provide greater flexibility, it may require a more complex implementation as well as a more complex management, both internally and from a user point of view.

As illustrated in FIG. 8, within a zone, which may be the one big array 200, the SysAdmin (not shown) may create three classes of service for, for example, a file service: Gold, Silver, and Bronze. The SysAdmin may create the Root Tenant (not shown), as described in U.S. patent application Ser. No. 13/631,030 entitled "METHOD AND APPARATUS FOR FEDERATING A PLURALITY OF ONE BIG ARRAYS". The Root Tenant Admin (not shown) may be assigned all three classes of service: Gold, Silver, and Bronze. FIG. 8 does not depict the Root Tenant, which, in certain embodiments, is effectively an internal construct introduced to create a self-referencing, recursive Tenant hierarchy.

In turn, the Root Tenant may create a top-level Tenant associated with a Tenant Organization 800. The Tenant Admin 805 may be assigned all three File service classes of service: Gold 807, Silver 808, and Bronze 809. Users 810, 815 of the Tenant Organization 800 may use any of these classes of service for provisioning resources. For example, Tenant User 1 810 may provision a file store comprising 10 GB of Gold class of service storage and 20 GB of Bronze class of service storage; and Tenant User 2 815 may provision a file store comprising 40 GB of Silver class of service storage.

In certain embodiments, the Tenant Admin 805 may create sub-tenants. As illustrated in FIG. 8, the Tenant Admin 805 may create two sub-tenants: Sub-Tenant 1 $800_{SUB1}$ and Sub-Tenant 2 $800_{SUB2}$. The Tenant Admin 805 may assign Gold 822 and Silver 823 classes of service to Sub-Tenant 1 $800_{SUB1}$, such as by adding Sub-Tenant 1 Admin 820 to an access control list for the Gold 807 and Silver 808 classes of service. Thus, Sub-Tenant 1 Admin 820 can see Gold 822 and Silver 823 classes of service and its users (e.g., Sub-Tenant 1 User 1 825 and Sub-Tenant 1 User 2 830) can use these classes of service for provisioning resources. Note that Users 825, 830 of Sub-Tenant 1 $800_{SUB1}$ do not have access to the Bronze 809 class of service in the example embodiment illustrated in FIG. 8. Further, the Tenant Admin 805 may assign Silver 837 and Bronze 838 classes of service to Sub-Tenant 2 $800_{SUB2}$, such as by adding Sub-Tenant 2 Admin 835 to an access control list for the Silver 808 and Bronze 809 classes of service.

As described in U.S. patent application Ser. No. 13/631,030 entitled "METHOD AND APPARATUS FOR FEDERATING A PLURALITY OF ONE BIG ARRAYS", the Sub-Tenants $800_{SUB1}$, $800_{SUB2}$ may create further levels of subtenants and constrain the propagation of their classes of service to their subtenants.

Figure 9:
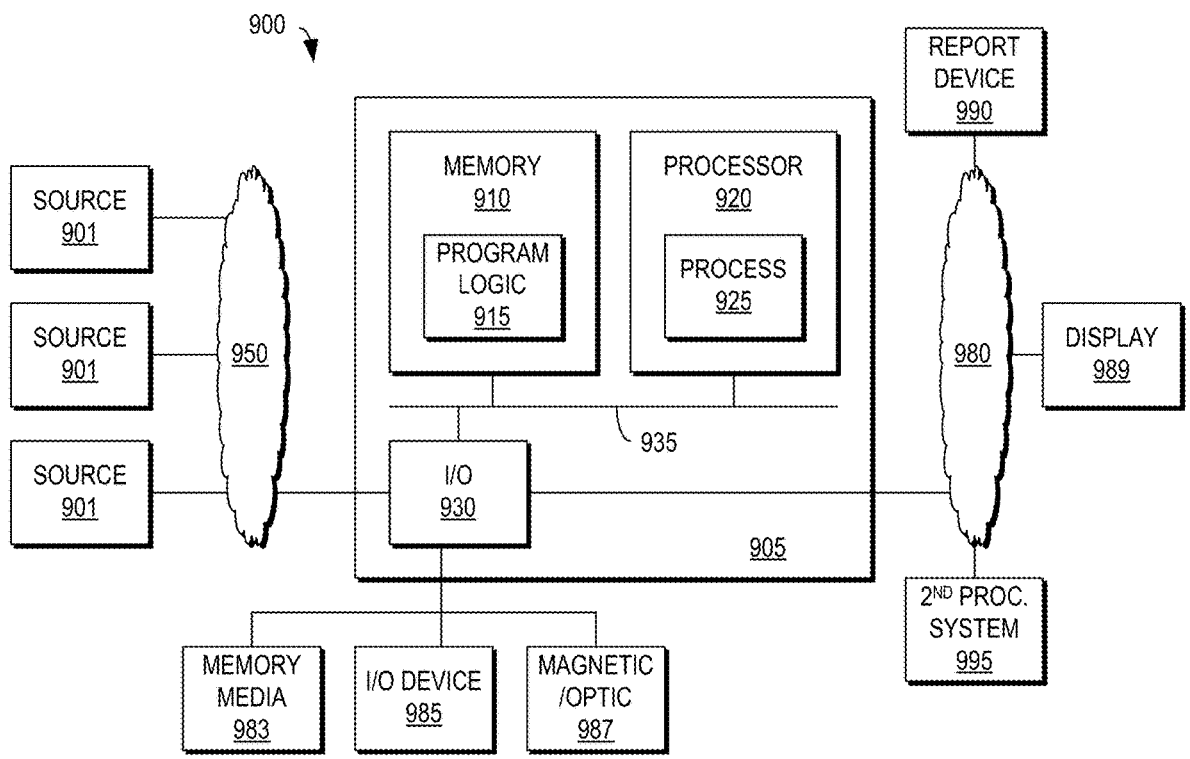
FIG. 9 is a block diagram illustrating an apparatus according to an example embodiment the present invention.

FIG. 9 is a block diagram of an example embodiment apparatus 905 according to the present invention. The apparatus 905 may be part of a system 900 and includes memory 910 storing program logic 915, a processor 920 for executing a process 925, and a communications I/O interface 930, all connected, for example, by a bus 935. One or more I/O ports 930 may provide connectivity to memory media 983, I/O devices 985, and drives 987, such as magnetic or optical drives. The system 900 is configured to communicate with a plurality of sources 901 via a network 950 using the one or more I/O ports 930. The system 900 is further configured to communicate with a display 989, a report device 990, and a second processing system 995 via a network 980 using the one or more I/O ports 930.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 9, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 10:
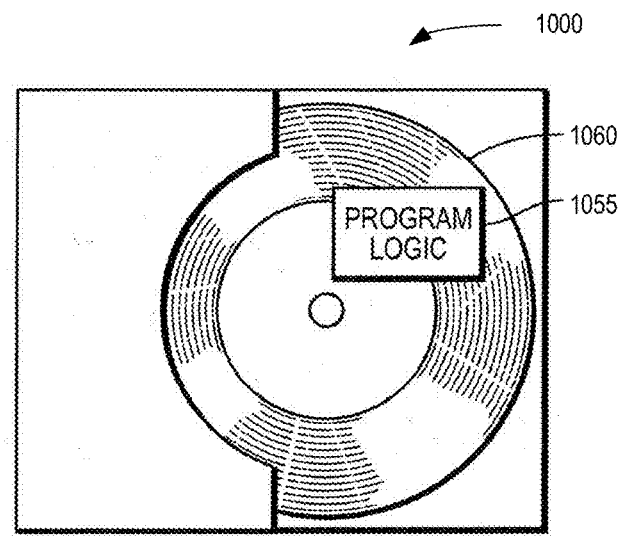
FIG. 10 is an illustration of an apparatus as embodied in program code according to an example embodiment of the present invention.

FIG. 10 shows program logic 1055 embodied on a computer-readable medium 1060 as shown, and wherein the logic is encoded in computer-executable code configured for carrying out the gas controlling process of this invention and thereby forming a computer program product 1000.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method comprising:
   receiving a request to provision heterogeneous storage resources of a one big array according to a desired class of service, the heterogeneous storage resources having a plurality of storage capabilities and the one big array enabling presentation of the heterogeneous storage resources as a single logical storage system enabled to provision multiple types of data services through a single control path according to a plurality of data paths for the heterogeneous storage resources, wherein the data services comprise file storage, block storage, and object storage;
   searching for the heterogeneous storage resources to provision according to the desired class of service using a pool search, wherein the pool search is based on a combination of two or more storage capabilities, a plurality of value types for the storage capabilities, and an indication of whether the storage capability will be used or not used in the pool search;
   allocating a first heterogeneous storage resource according to the results of the pool search if the first heterogeneous storage resource is compatible with the desired class of service;
   assigning an alternate class of service different from the desired class of service upon determining that the heterogeneous storage resources compatible with the desired class of service are unavailable, wherein the alternate class of service is substantially similar to the desired class of service;
   allocating the first heterogeneous storage resource according to the results of the pool search in accordance with the alternate class of service, if an alternate class of service has been selected;
   causing the requested file, block, and object storage resources, of the first heterogeneous storage resource, to be provisioned on the one big array according to the request to provision heterogeneous storage resources and a provisioning policy; and initiating execution of an information lifecycle management policy for management of data stored to the first heterogeneous storage resource according to either the desired class of service or the alternate class of service;

wherein the desired class of service and the alternate class of service are selected from a plurality of distinct classes of service, each class of service of the plurality of distinct classes of service defining storage attributes corresponding to storage capabilities of the heterogenous storage resources;

wherein the desired class of service or the alternate class of service comprises a meta class of service, the meta class of service composed of given ones of the storage attributes selected from the plurality of distinct classes of service;

wherein the meta class of service comprises a first storage attribute of a first class of service and a second storage attribute of a second class of service, the second storage attribute being different from the first storage attribute;

wherein initiating execution of an information lifecycle management policy further comprises storing the data in the first heterogeneous storage resource for a first period of a time domain according to the first storage attribute of the first class of service and storing the data in a second heterogenous storage resource for a second period of the time domain different from the first period of time domain according to the second storage attribute of the second class of service; and wherein the method is performed by at least one processing device comprising a processor coupled to a memory.

2. The method of claim 1 wherein the desired class of service or the alternate class of service comprises a plurality of lines of service and describes heterogeneous storage resources available from the one big array and wherein receiving a request to provision heterogeneous storage resources of a one big array according to the plurality of lines of service comprises receiving an indication regarding attributes of each respective line of service of a set of requested lines of service of the plurality of lines of service.

3. The method of claim 2 wherein causing the requested heterogeneous storage resources to be provisioned according to a provisioning policy comprises causing allocation of storage of respective ones of the heterogeneous storage resources according to the storage requested for the requested lines of service, the availability of the heterogeneous storage resources, and attributes of the heterogeneous storage resources.

4. The method of claim 3 wherein causing allocation of storage of respective ones of the heterogeneous storage resources according to the storage requested for the requested lines of service, the availability of the heterogeneous storage resources, and attributes of the heterogeneous storage resources comprises forwarding attributes of the lines of service requested in the provisioning request to a provisioning engine, the provisioning engine configured to analyze the attributes of the requested lines of service and, in conjunction with a placement scheduler configured to analyze attributes of the heterogeneous storage resources, allocate storage of respective ones of the heterogeneous storage resources according to the storage requested for the requested lines of service, the availability of the heterogeneous storage resources, and attributes of the heterogeneous storage resources.

5. The method of claim 3 wherein causing the requested heterogeneous storage resources to be provisioned according to a provisioning policy further comprises establishing connections between respective storage resources of the heterogeneous storage resources to provide the desired class of service or the alternate class of service.

6. The method of claim 3 wherein causing allocation of storage of respective ones of the heterogeneous storage resources according to the storage requested for the requested lines of service, the availability of the heterogeneous storage resources, and attributes of the heterogeneous storage resources comprises provisioning storage in a first storage resource to store data according to a first phase of the information lifecycle management policy.

7. The method of claim 6 further comprising reserving space in a second storage resource according to a second phase of the information lifecycle management policy.

8. The method of claim 1 wherein initiating execution of an information lifecycle management policy for management of data stored to the first heterogeneous storage resource according to the desired class of service or the alternate class of service further comprises transitioning from a first phase of the information lifecycle management policy to a second phase of the information lifecycle management policy by moving the data from a first class of storage to a second class of storage according to the desired class of service or the alternate class of service.

9. The method of claim 8 wherein moving the data from the first class of storage to the second class of storage according to the desired class of service or the alternate class of service comprises moving the data between tiers of a first storage resource and a second storage resource.

10. The method of claim 1 wherein the storage capabilities of the heterogenous storage resources are selected from the group consisting of access-protocol, size, performance, resiliency, max-paths, space-efficient, allocate-on-demand, neighborhood, encryption, data-retention-time, data-destruction-method, zone, recovery-point-objective, max-snapshots, multi-volume-consistency, recovery-point-objective, max-copies, multi-volume-consistency and zone.

11. An apparatus comprising:

a processor; and memory storing instructions that, when executed on the processor, cause the apparatus to:

receive a request to provision heterogeneous storage resources of a one big array according to a desired class of service, the heterogeneous storage resources having a plurality of storage capabilities and the one big array enabling presentation of the heterogeneous storage resources as a single logical storage system enabled to provision multiple types of data services through a single control path according to a plurality of data paths for the heterogeneous storage resources, wherein the data services comprise file storage, block storage, and object storage;

search for the heterogeneous storage resources to provision according to the desired class of service using a pool search, wherein the pool search is based on a combination of two or more storage capabilities, a plurality of value types for the storage capabilities, and an indication of whether the storage capability will be used or not used in the pool search;

allocate a first heterogeneous storage resource according to the results of the pool search if the first heterogeneous storage resource is compatible with the desired class of service;

assign an alternate class of service different from the desired class of service upon determining that the heterogeneous storage resources compatible with the desired class of service are unavailable, wherein the alternate class of service is substantially similar or closest to the desired class of service;

allocate the first heterogeneous storage resource according to the results of the pool search in accordance with the alternate class of service, if an alternate class of service has been selected;

cause the requested file, block, and object storage resources, of the first heterogeneous storage resource, to be provisioned on the one big array according to the request to provision heterogeneous storage resources and a provisioning policy; and initiate execution of an information lifecycle management policy for management of data stored to the first heterogeneous storage resource according to either the desired class of service or the alternate class of service;

wherein the desired class of service and the alternate class of service are selected from a plurality of distinct classes of service, each class of service of the plurality of distinct classes of service defining storage attributes corresponding to storage capabilities of the heterogenous resources;

wherein the desired class of service or the alternate class of service comprises a meta class of service, the meta class of service composed of given ones of the storage attributes selected from the plurality of distinct classes of service;

wherein the meta class of service comprises a first storage attribute of a first class of service and a second storage attribute of a second class of service, the second storage attribute being different from the first storage attribute; and wherein initiating execution of an information lifecycle management policy further comprises storing the data in the first heterogeneous storage resource for a first period of a time domain according to the first storage attribute of the first class of service and storing the data in a second heterogenous storage resource for a second period of the time domain different from the first period of time domain according to the second storage attribute of the second class of service.

12. The apparatus of claim 11 wherein the desired class of service or the alternate class of service comprises a plurality of lines of service and describes heterogeneous storage resources available from the one big array and wherein the instructions to receive a request to provision heterogeneous storage resources of a one big array according to the plurality of lines of service comprises instructions to receive an indication regarding attributes of each respective line of service of a set of requested lines of service of the plurality of lines of service.

13. The apparatus of claim 12 wherein instructions to cause the requested heterogeneous storage resources to be provisioned according to a provisioning policy comprise instructions to cause allocation of storage of respective ones of the heterogeneous storage resources according to the storage requested for the requested lines of service, the availability of the heterogeneous storage resources, and attributes of the heterogeneous storage resources.

14. The apparatus of claim 13 wherein instructions to cause allocation of storage of respective ones of the heterogeneous storage resources according to the storage requested for the requested lines of service, the availability of the heterogeneous storage resources, and attributes of the heterogeneous storage resources comprise instructions to forward attributes of the lines of service requested in the provisioning request to a provisioning engine, the provisioning engine configured to analyze the attributes of the requested lines of service and, in conjunction with a placement scheduler configured to analyze attributes of the heterogeneous storage resources, allocate storage of respective ones of the heterogeneous storage resources according to the storage requested for the requested lines of service, the availability of the heterogeneous storage resources, and attributes of the heterogeneous storage resources.

15. The apparatus of claim 13 wherein instructions to cause the requested heterogeneous storage resources to be provisioned according to a provisioning policy further comprise instructions to establish use connections between respective storage resources of the heterogeneous storage resources to provide the desired class of service or the alternate class of service.

16. The apparatus of claim 13 wherein instructions to cause allocation of storage of respective ones of the heterogeneous storage resources according to the storage requested for the requested lines of service, the availability of the heterogeneous storage resources, and attributes of the heterogeneous storage resources comprise instructions to provision storage in a first storage resource to store data according to a first phase of the information lifecycle management policy.

17. The apparatus of claim 16 further comprising instructions to reserve space in a second storage resource according to a second phase of the information lifecycle management policy.

18. The apparatus of claim 11 wherein instructions to initiate execution of an information lifecycle management policy for management of data stored to the first heterogeneous storage resource according to the desired class of service or the alternate class of service further comprises transitioning from a first phase of the information lifecycle management policy to a second phase of the information lifecycle management policy by moving the data from a first class of storage to a second class of storage according to the desired class of service or the alternate class of service.

19. The apparatus of claim 18 wherein instructions to move the data from the first class of storage to the second class of storage according to the class of service or the alternate class of service comprise instructions to move the data between at least one of tiers of a first storage resource and a second storage resource.

20. The apparatus of claim 11 wherein the storage capabilities of the heterogenous storage resources are selected from the group consisting of access-protocol, size, performance, resiliency, max-paths, space-efficient, allocate-on-demand, neighborhood, encryption, data-retention-time, data-destruction-method, zone, recovery-point-objective, max-snapshots, multi-volume-consistency, recovery-point-objective, max-copies, multi-volume-consistency and zone.

21. A computer program product including a non-transitory computer-readable storage medium encoded with computer program code that, when executed on a processor of a computer, causes the computer to provide information lifecycle management using a federation of arrays, the computer program product comprising:

computer program code for receiving a request to provision heterogeneous storage resources of a one big array according to a desired class of service, the heterogeneous storage resources having a plurality of storage capabilities and the one big array enabling presentation of the heterogeneous storage resources as a single logical storage system enabled to provision multiple types of data services through a single control path according to a plurality of data paths for the heterogeneous storage resources, wherein the data services comprise file storage, block storage, and object storage;

computer program code for searching for the heterogeneous storage resources to provision according to the desired class of service using a pool search, wherein the pool search is based on a combination of two or more storage capabilities, a plurality of value types for the storage capabilities, and an indication of whether the storage capability will be used or not used in the pool search, wherein the storage capabilities are selected from the group consisting of access-protocol, size, performance, resiliency, max-paths, space-efficient, allocate-on-demand, neighborhood, encryption, data-retention-time, data-destruction-method, zone, recovery-point-objective, max-snapshots, multi-volume-consistency, recovery-point-objective, max-copies, multi-volume-consistency, or zone;

computer program code for allocating a first heterogeneous storage resource according to the results of the pool search if the first heterogeneous storage resource is compatible with the desired class of service;

computer program code for assigning an alternate class of service different from the desired class of service upon determining that the heterogeneous storage resources compatible with the desired class of service are unavailable, wherein the alternate class of service is substantially similar or closest to the desired class of service;

computer program code for allocating the first heterogeneous storage resource according to the results of the pool search in accordance with the alternate class of service, if an alternate class of service has been selected;

computer program code for causing the requested file, block, and object storage resources, of the first heterogeneous storage resource, to be provisioned on the one big array according to the request to provision heterogeneous storage resources and a provisioning policy; and computer program code for initiating execution of an information lifecycle management policy for management of data stored to the first heterogeneous storage resource according to either the desired class of service or the alternate class of service;

wherein the desired class of service and the alternate class of service are selected from a plurality of distinct classes of service, each class of service of the plurality of distinct classes of service defining storage attributes corresponding to storage capabilities of the heterogenous resources;

wherein the desired class of service or the alternate class of service comprises a meta class of service, the meta class of service composed of given ones of the storage attributes selected from the plurality of distinct classes of service;

wherein the meta class of service comprises a first storage attribute of a first class of service and a second storage attribute of a second class of service, the second storage attribute being different from the first storage attribute; and wherein initiating execution of an information lifecycle management policy further comprises storing the data in the first heterogeneous storage resource for a first period of a time domain according to the first storage attribute of the first class of service and storing the data in a second heterogenous storage resource for a second period of the time domain different from the first period of time domain according to the second storage attribute of the second class of service.

* * * * *